United States Patent
Fisch et al.

(10) Patent No.: US 11,940,556 B2
(45) Date of Patent: Mar. 26, 2024

(54) TESTING DEVICE FOR TESTING A DISTANCE SENSOR THAT OPERATES USING ELECTROMAGNETIC WAVES

(71) Applicant: dSPACE digital signal processing and control engineering GmbH, Paderborn (DE)

(72) Inventors: Tim Fisch, Paderborn (DE); Jeffrey Paul, Torrance, CA (US); Jonathan Watkins, Los Angeles, CA (US)

(73) Assignee: DSPACE GMBH, Paderborn (DE)

(*) Notice: Subject to any disclaimer, the term of this patent is extended or adjusted under 35 U.S.C. 154(b) by 219 days.

(21) Appl. No.: 17/469,921

(22) Filed: Sep. 9, 2021

(65) Prior Publication Data

US 2023/0076301 A1   Mar. 9, 2023

(51) Int. Cl.
  G01S 7/40   (2006.01)
  G01S 7/497   (2006.01)
  G01S 13/00   (2006.01)

(52) U.S. Cl.
  CPC ............ G01S 7/4095 (2021.05); G01S 7/497 (2013.01)

(58) Field of Classification Search
  None
  See application file for complete search history.

(56) References Cited

U.S. PATENT DOCUMENTS 4,319,247 A * 3/1982 Warren ................ G01S 7/4052
  342/171
4,730,191 A * 3/1988 Groebke ................ G09B 9/54
  434/2

(Continued)

FOREIGN PATENT DOCUMENTS

DE   102019102077 A1   7/2020
RU        189247 U1 *   5/2019   ............... G01S 7/40
WO   WO 2020165191 A1   8/2020

OTHER PUBLICATIONS

J. Iberle, M. A. Mutschler, P. A. Scharf and T. Walter, "A Radar Target Simulator for Generating Micro-Doppler-Signatures of Vulnerable Road Users," 2019 16th European Radar Conference (EuRAD), Paris, France, 2019, pp. 17-20. (Year: 2019).*

(Continued)

*Primary Examiner* — Bernarr E Gregory (74) *Attorney, Agent, or Firm* — LEYDIG, VOIT & MAYER, LTD.

(57) ABSTRACT

A testing device for testing a distance sensor includes: a receiver for receiving an electromagnetic free-space wave as a receive signal; an analog-to-digital converter configured to, in a simulation mode, convert the receive signal into a sampled signal; a signal-processing unit configured to: delay the sampled signal or a modulated sampled signal to form a delayed sampled signal or a modulated delayed sampled signal; and modulate, upon the sampled signal or upon the delayed sampled signal, a predeterminable Doppler signature as a characteristic motion profile of a reflecting object to be simulated to form the modulated sampled signal or the modulated delayed sample signal; a digital-to-analog converter configured to convert the modulated or the modulated delayed sampled signal into a simulated reflected signal; and a transmitter configured to radiate the simulated reflected signal or a simulated reflected signal derived from the simulated reflected signal as an output signal.

15 Claims, 7 Drawing Sheets

(56) References Cited

U.S. PATENT DOCUMENTS

| | | | |
|---|---|---|---|
| 5,117,231 A | | 5/1992 | Yaron |
| 5,164,734 A | * | 11/1992 | Fredericks ............ G01S 7/4052 342/187 |
| 5,431,568 A | * | 7/1995 | Fey ........................ G01S 7/4052 342/174 |
| 5,892,479 A | | 4/1999 | Mills et al. |
| 6,067,041 A | * | 5/2000 | Kaiser ................... G01S 7/4086 342/171 |
| 6,075,480 A | * | 6/2000 | Deliberis, Jr. ........ G01S 7/4052 342/194 |
| 2004/0012517 A1 | * | 1/2004 | Abou-Jaoude ........ G01S 7/4052 342/171 |
| 2008/0018525 A1 | | 1/2008 | Svy et al. |
| 2017/0010346 A1 | * | 1/2017 | Rolfsmeier ........... G01S 7/4052 |
| 2020/0110156 A1 | * | 4/2020 | Ahmed ................ G01S 7/4095 |
| 2021/0293924 A1 | * | 9/2021 | Chritton ................ G01S 7/4052 |
| 2022/0107389 A1 | | 4/2022 | Birkenhauer et al. |

OTHER PUBLICATIONS

R. Abou-Jaoude, M. Grace, D. Geller, K. Noujeim, D. Bradley and W. Oldfield, "Low Cost 76GHz Radar Target Simulator and Test System," 2000 30th European Microwave Conference, Paris, France, 2000, pp. 1-4, doi: 10.1109/EUMA.2000.338847. (Year: 2000).*
Johannes Iberle, et al., "A Radar Target Simulator for Generating Micro-Doppler-Signatures of Vulnerable Road Users", Proceedings of the 16thEuropean Radar Conference, Oct. 2-4, 2019, pp. 17-20, IEEE, New York, USA.

* cited by examiner

TESTING DEVICE FOR TESTING A DISTANCE SENSOR THAT OPERATES USING ELECTROMAGNETIC WAVES

FIELD

The invention relates to a testing device for testing a distance sensor that operates using electromagnetic waves, the testing device including a receiving element for receiving an electromagnetic free-space wave as a receive signal and a radiating element for radiating an electromagnetic output signal. In the simulation mode, the receive signal or a receive signal derived from the receive signal is converted by an analog-to-digital converter into a sampled signal, the sampled signal is delayed by a signal-processing unit to form a delayed sampled signal using a settable time delay, the delayed sampled signal is converted by a digital-to-analog converter into a simulated reflected signal, the simulated reflected signal or a simulated reflected signal derived from the simulated reflected signal being radiated as an output signal via the radiating element. Furthermore, the invention also relates to a method that is performed by the signal-processing unit of the aforedescribed testing device for testing a distance sensor that operates using electromagnetic waves, and to a computer program having instructions which, when executed by the signal-processing unit of the described testing device for testing a distance sensor that operates using electromagnetic waves, cause the signal-processing unit to perform the aforementioned method.

BACKGROUND

Testing devices of the aforementioned type for testing distance sensors and methods for operating such testing devices are known from various technical fields and applications, such as, for example, development of control units and control unit testing, in particular in the automotive field. In this regard, reference is made, for example, to WO 2020/165191 A1. Another field of application is end-of-line test benches; i.e., equipment used for testing products (here distance sensors) at the end of a production line. The present case concerns the testing of distance sensors that operate using electromagnetic waves. In the automotive field, the sensors most predominantly used are radar sensors. However, it is fundamentally also possible to test distance sensors which operate in a different frequency range of electromagnetic waves, for example, in the range of visible light, or which operate using electromagnetic radiation sources which emit electromagnetic waves having a long coherence length, such as in laser applications (e.g., lidar).

Using the testing devices described at the outset, it is possible to simulate a reflecting object at virtually any distance to the distance sensor to be tested. The basic operating principle of the distance sensors of the type under consideration here is that electromagnetic waves emitted therefrom are reflected by a reflecting object in the radiation range of the distance sensor, and the distance sensor receives the reflected electromagnetic waves and determines the distance to the object from the propagation time of the electromagnetic waves. The determination of the signal propagation time may be performed directly (time-of-flight measurement), but often it is performed indirectly via smart signal analyses. In the first case, often very short sensor signals (i.e., pulses) are used, while in the latter case, appreciably temporally extended transmit signals are mostly used, and the desired distance information is derived from the frequency of the mixed signal composed of the transmitted signal and the received reflected signal. Frequency-modulated continuous wave signals may be mentioned here as an example of temporally extended transmit signals.

In order to test the distance sensor, the testing device is positioned in the radiation range thereof, the testing device receives the free-space waves emitted by the distance sensor and delays this receive signal via its signal-processing unit according to a set time delay, and then radiates the delayed signal via its radiating element back toward the distance sensor to be tested, thereby giving the distance sensor the impression of a reflecting object that is spaced apart by a distance corresponding to the set time delay.

If the object that reflects the transmit signals from the distance sensor has a radial motion component relative to the distance sensor, then the reflected signals are frequency-shifted with respect to the frequency of the transmit signal from the distance sensor due to the Doppler effect. Many distance sensors also analyze the reflected signal with respect to the frequency shift so as to obtain velocity information about the radial motion component. For this purpose, it is not necessary to determine the frequency of the reflected signal directly. Rather, it is also possible to perform smart signal analysis as in the determination of the time delay. For example, the phase shift between mixed signals of a plurality of transmit and receive signals may be analyzed, the details of the analysis not being important here. Rather, what is important is that the testing devices under consideration and the considered method for operating the testing devices are able to effect corresponding shifts in the frequency of the simulated reflected signal with respect to the frequency of the receive signal so as to reproduce selected radial motion components in the simulated reflected signal.

There are reflecting objects which do not have only one radial motion component, but a motion profile including a plurality of radial motion components resulting from relatively moving object components. This applies, for example, to pedestrians (arm, leg and torso movements), bicycles (frame, spokes), or also to helicopters (fuselage, rotor blades). Regardless of whether a reflecting object has one or a plurality of motion components, it impresses a characteristic Doppler signature upon the reflected signal.

SUMMARY

In an exemplary embodiment, the present invention provides a testing device for testing a distance sensor that operates using electromagnetic waves. The testing device includes: a receiver for receiving an electromagnetic free-space wave as a receive signal; an analog-to-digital converter configured to, in a simulation mode, convert the receive signal or a receive signal derived from the receive signal into a sampled signal; a signal-processing unit configured to: delay, using a settable time delay, the sampled signal or a modulated sampled signal to form a delayed sampled signal or a modulated delayed sampled signal; and modulate, upon the sampled signal or upon the delayed sampled signal, a predeterminable Doppler signature as a characteristic motion profile of a reflecting object to be simulated to form the modulated sampled signal or the modulated delayed sample signal; a digital-to-analog converter configured to convert the modulated sampled signal or the modulated delayed sampled signal into a simulated reflected signal; and a transmitter configured to radiate the simulated reflected signal or a simulated reflected signal derived from the simulated reflected signal as an output signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Since future distance sensors will perhaps also perform an analysis with respect to more complex Doppler signatures when analyzing a reflected signal, exemplary embodiments of the present invention provide a testing device for testing distance sensors and a corresponding method for operating such a testing device which will enable simulation of such reflected signals.

In the above-described testing device and the above-described method for operating a testing device for testing a distance sensor that operates using electromagnetic waves, exemplary embodiments of the present invention provide for the signal-processing unit modulating upon the sampled signal or upon the delayed sampled signal a predeterminable Doppler signature as a characteristic motion profile of a reflecting object to be simulated. Furthermore, the delayed sampled signal which is additionally provided with the Doppler signature is then converted into the simulated reflected signal by the digital-to-analog converter.

The modulation of the predeterminable Doppler signature upon the sampled signal or upon the delayed sampled signal is completely in the digital signal processing domain, which is much easier and more flexible to implement than an analog approach. In this regard, exemplary embodiments of the present invention provide for starting from a testing device that has a signal-processing unit implemented in digital technology instead of from a testing device where the signal processing is implemented with analog circuitry. Signal-processing units implemented in analog circuitry are, in fact, widely used and operate using, for example, cascaded signal delay lines. The signal-processing units used here are implemented based on, for example, digital signal processors or also using configured logic devices in the form of field programmable gate arrays (FPGA).

The predeterminable Doppler signature describes the characteristic frequency components that the simulated reflected signal is desired to contain. Accordingly, in the case of a reflecting object in the form of a pedestrian approaching the distance sensor with a radial motion component, the Doppler signature describes with the highest energy component the component of the radar signal that is reflected from the torso of the pedestrian and shifted toward higher frequencies, and with lower energy components the multiplicity of radar signal components that are shifted toward higher and lower frequencies as compared to the torso and which are caused by the pendulum movements of the limbs. Of course, it is also possible to simulate a reflecting object that has only one radial motion component, such as, for example, a motor vehicle. In this case, the Doppler signature is much simpler. The Doppler signature is selected such that when modulated upon the sampled signal or upon the delayed sampled signal, it will ultimately produce the desired characteristic motion profile in the simulated reflected signal.

A differentiation is made here between the terms "receive signal" and "receive signal derived from the receive signal." The receive signal has its origin in the free-space wave picked up by the receiving element of the testing device. If further signal processing takes place before sampling is performed by the analog-to-digital converter, then strictly speaking the signal in question is no longer the receive signal itself, but a receive signal derived therefrom. This is the case, for example, when the receive signal is down-converted to a lower intermediate frequency, whereby the demands placed on the technical implementation of the signal transmission paths and on the speed of signal processing, in particular on the analog-to-digital conversion, are reduced. Of course, this is also true after the digital-to-analog conversion for the simulated reflected signal and the simulated reflected signal derived from the simulated reflected signal (e.g., up-conversion to the desired transmission frequency).

In a variant of the testing device and the method for operating the testing device, provision is made for the signal-processing unit to first modulate the Doppler signature upon the sampled signal, and to then delay the sampled signal provided with the Doppler signature to form the delayed sampled signal using the set time delay. Similarly, in another variant of the testing device and the method for operating the testing device, provision is made for the signal-processing unit to first delay the sampled signal using the set time delay, and to then modulate the Doppler signature thereupon, thereby producing the delayed sampled signal which is additionally provided with the Doppler signature. Ultimately, the order in which the time delay and the impression of the Doppler signature are effected can be implemented in different ways. The unavoidable latency caused by other signal processing in the signal-processing unit or in the testing device is taken into account in the time delay. However, this is not different from known testing devices and methods for operating these known testing devices.

A preferred embodiment of the testing device and the method for operating the testing device is characterized in that the signal-processing unit splits the sampled signal or the delayed sampled signal into orthogonal signal components, modulates the orthogonal signal components with respective orthogonal signal components of the Doppler signature, and combines the modulated orthogonal signal components so obtained to form the sampled signal which is additionally provided with the Doppler signature. As will become apparent later herein, on this basis, the impression of the Doppler signature can be implemented very easily, the implementation being based solely on elementary mathematical operations and therefore being associated with minimum latencies, which is very advantageous.

A refinement of the aforementioned testing device and method provides that the signal-processing unit derive the orthogonal signal components from the Doppler signature, in particular by I/Q decomposition of the Doppler signature. Alternatively, the orthogonal signal components are input to the signal-processing unit as the Doppler signature. The information contents of the different forms of presentation of the Doppler signature are equivalent with regard to the description of a characteristic motion profile.

Another preferred embodiment of the aforedescribed testing device and the aforedescribed method for operating the testing device is characterized in that the splitting of the sampled signal or of the delayed sampled signal into orthogonal signal components is performed by I/Q decomposition, and in that the combining of the modulated orthogonal signal components into the sampled signal which is additionally provided with the Doppler signature is performed by I/Q composition. In the case of decomposition using the I/Q method mentioned, a signal is split into an in-phase component and a quadrature component (therefore "I/Q"), from which phase information can be derived. Conversely, during composition of the I/Q components, a signal having a particular phase angle can be produced.

A preferred embodiment of the aforedescribed testing device and the aforedescribed method for operating the testing device provides that the splitting of the sampled signal or of the delayed sampled signal into orthogonal signal components be performed by a 90° phase shifting of the sampled signal or of the delayed sampled signal, and/or that the modulating of the orthogonal signal components be performed by multiplication with the respective orthogonal signal components of the Doppler signature, and/or that the combining of the modulated orthogonal signal components into the sampled signal which is additionally provided with the Doppler signature be performed by addition of the modulated orthogonal signal components. The 90° phase shifting of the sampled signal or of the delayed sampled signal may be accomplished, for example, by a Hilbert transform implemented as a digital FIR filter. Overall, this embodiment is very easy to implement, and since it virtually uses only elementary operations (multiplication, addition), it is associated with minimum (and ideally constant) latencies. This also applies to the digital implementation of a FIR filter for 90° phase shifting.

Although in the foregoing, exemplary embodiments of the device and the method have been described together, it should once more be noted that the method is computer-implemented and used to operate a testing device for testing a distance sensor that operates using electromagnetic waves. In order to carry out the method, the testing device has a receiving element for receiving an electromagnetic free-space wave as a receive signal, a radiating element for radiating an electromagnetic output signal, an analog-to-digital converter, a signal-processing unit, and a digital-to-analog converter. In the simulation mode, the receive signal or a receive signal derived from the receive signal is converted by the analog-to-digital converter into a sampled signal, the sampled signal is delayed by the signal-processing unit to form a delayed sampled signal using a set time delay, and the delayed sampled signal is converted by the digital-to-analog converter into a simulated reflected signal, the simulated reflected signal or a simulated reflected signal derived from the simulated reflected signal then being radiated as an output signal via the radiating element. To allow easy simulation of a characteristic motion profile of a reflecting object, the method provides that the signal-processing unit modulate upon the sampled signal or upon the delayed sampled signal a predeterminable Doppler signature as a characteristic motion profile of a reflecting object to be simulated, and that the delayed sampled signal which is additionally provided with the Doppler signature be converted into the simulated reflected signal by the digital-to-analog converter. The more detailed embodiments of the method steps have been described in detail hereinbefore, mostly in connection with the signal-processing unit. The designation of "signal-processing unit" should be understood in a functional sense. Components that belong to the signal-processing unit include all components which perform the functionality attributed to the signal-processing unit. The signal-processing unit may include one component or a plurality of components.

In another exemplary embodiment, the present invention provides a computer program having instructions which, when executed by a signal-processing unit of a testing device for testing a distance sensor that operates using electromagnetic waves, cause the signal-processing unit to perform the aforedescribed method for operating the testing device.

In FIGS. 1 through 7, a testing device 1 for testing a distance sensor 2 that operates using electromagnetic waves and a method 10 for operating such a testing device 1 are illustrated in various sections, aspects, and degrees of detail. No distinction is made in the figures between an illustration of only the testing device 1 and an illustration of only the method 10, which would not be practical anyway because method 10 is carried out on a testing device 1 using the elements of the testing device 1.

Figure 1:
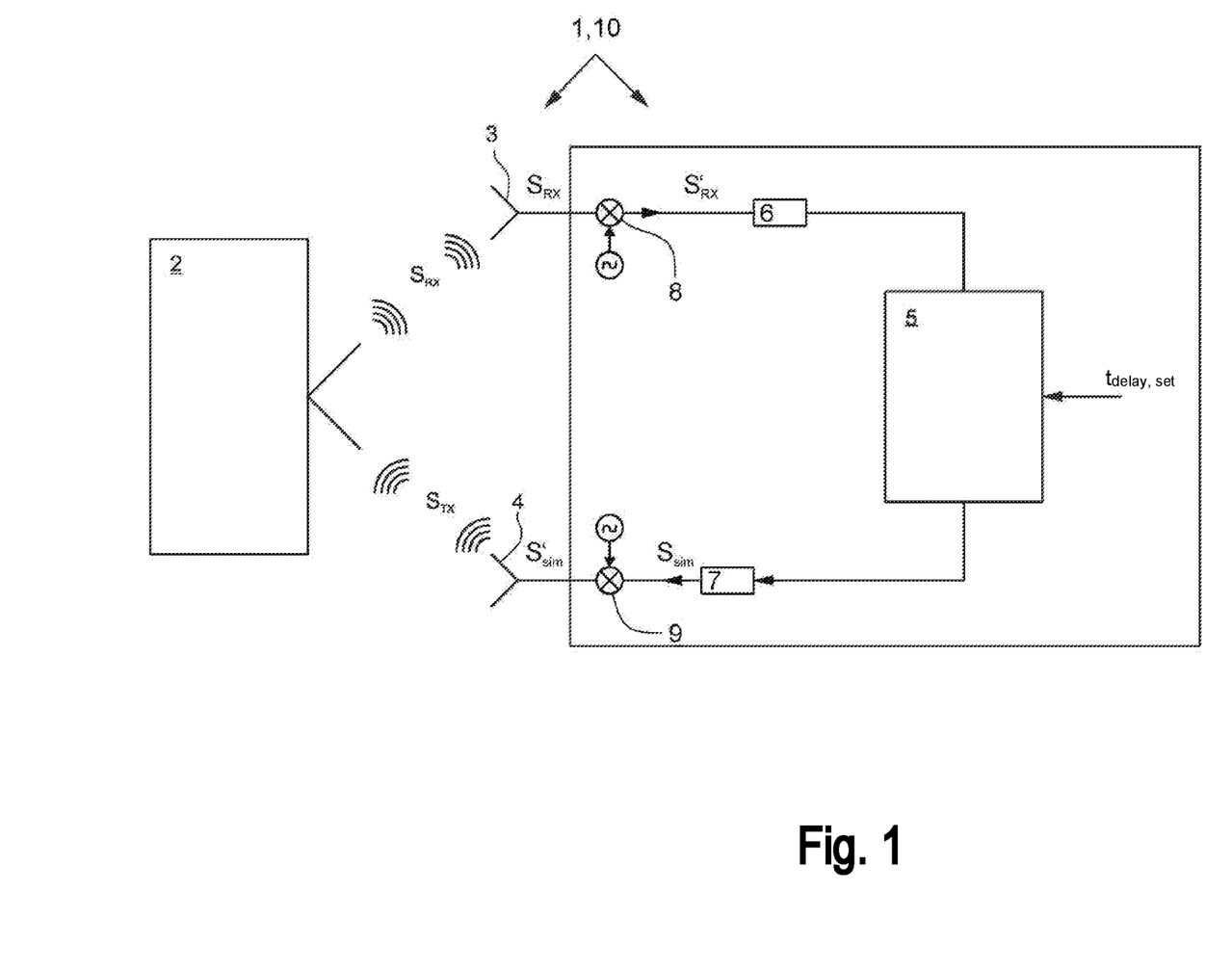
FIG. 1 schematically shows a prior art testing device for testing a distance sensor that operates using electromagnetic waves, as well as a corresponding method for operating such a testing device.

FIG. 1 shows the overall setup for the testing of the distance sensor 2 to be tested. Distance sensor 2 emits an electromagnetic free-space wave toward testing device 1 and receives a simulated reflected electromagnetic signal Six generated by testing device 1. Testing device 1 has a receiving element 3 for receiving the free-space wave emitted by distance sensor 2 and a radiating element 4 for radiating the simulated reflected electromagnetic signal Six. Although distance sensor 2 itself does not belong to testing device 1, it is important to understand how testing device 1 interacts with distance sensor 2.

Considered here are testing devices 1 in which the signal processing is implemented digitally; i.e., as a sampling system. In this respect, the receive signal S'Rx derived by down-conversion from the receive signal $S_{RX}$ via an input mixer 8 is sampled by an analog-to-digital converter 6. The sampled signal $S_{sample}$ is fed through a signal-processing unit 5, a time delay $t_{delay,\ set}$ being inputtable to signal-processing unit 5. The input signal of signal-processing unit 5; i.e., the sampled signal $S_{sample}$, is thus delayed 11 to form a delayed sampled signal $S_{sample,sim}$. The delayed sampled signal $S_{sample,sim}$ is then converted by a digital-to-analog converter 7 into an analog simulated reflected signal $S_{sim}$, up-converted back to the required transmission frequency via output mixer 9, and is then radiated as a derived simulated reflected signal $S'_{sim}$ via radiating element 4. The down-conversion of the receive signal $S_{RX}$ to a lower intermediate frequency and the up-conversion of the simulated reflected signal $S_{sim}$ to the required higher transmission frequency are optional and enable digital signal processing at sampling and clock rates lower than those required if signal processing were performed at the original reception frequency of the receive signal $S_{RX}$.

In FIG. 1, it is indicated that the time delay $t_{delay,\ set}$ to be achieved is fed as information to signal-processing unit 5. The details of the technical implementation of how this information is fed to signal-processing unit 5 are not important to the testing device 1 shown here. The input for the time delay to be set will typically come from an environment simulator that simulates the scene of environmental objects to be simulated and holds corresponding position, velocity and/or acceleration information of the environmental objects available. For example, if the distance of the object to be simulated from the distance sensor to be tested is known to be 30 m, then a corresponding time delay is calculated as the signal propagation time of an electromagnetic wave, taking into account the speed of light, and is set as the time delay $t_{delay,\ set}$.

FIGS. 2 through 7 illustrate how the simulated reflected signal $S_{sim}$ can additionally be provided with a Doppler signature $S_{doppler}$ to be able to simulate reflecting objects with any desired movement pattern, in particular also reflecting objects with complex movement patterns, such as pedestrians.

In all of the exemplary embodiments illustrated in FIGS. 2 through 7, this is achieved by the signal-processing unit 5 modulating 12 upon the sampled signal $S_{sample}$ or upon the delayed sampled signal $S_{sample,sim}$ a predeterminable Doppler signature as a characteristic motion profile of a reflecting object to be simulated. The delayed sampled signal $S_{sample,sim}$ which is additionally provided with the Doppler signature $S_{doppler}$ is then converted into the simulated reflected signal $S_{sim}$ by digital-to-analog converter 7.

Figure 2:
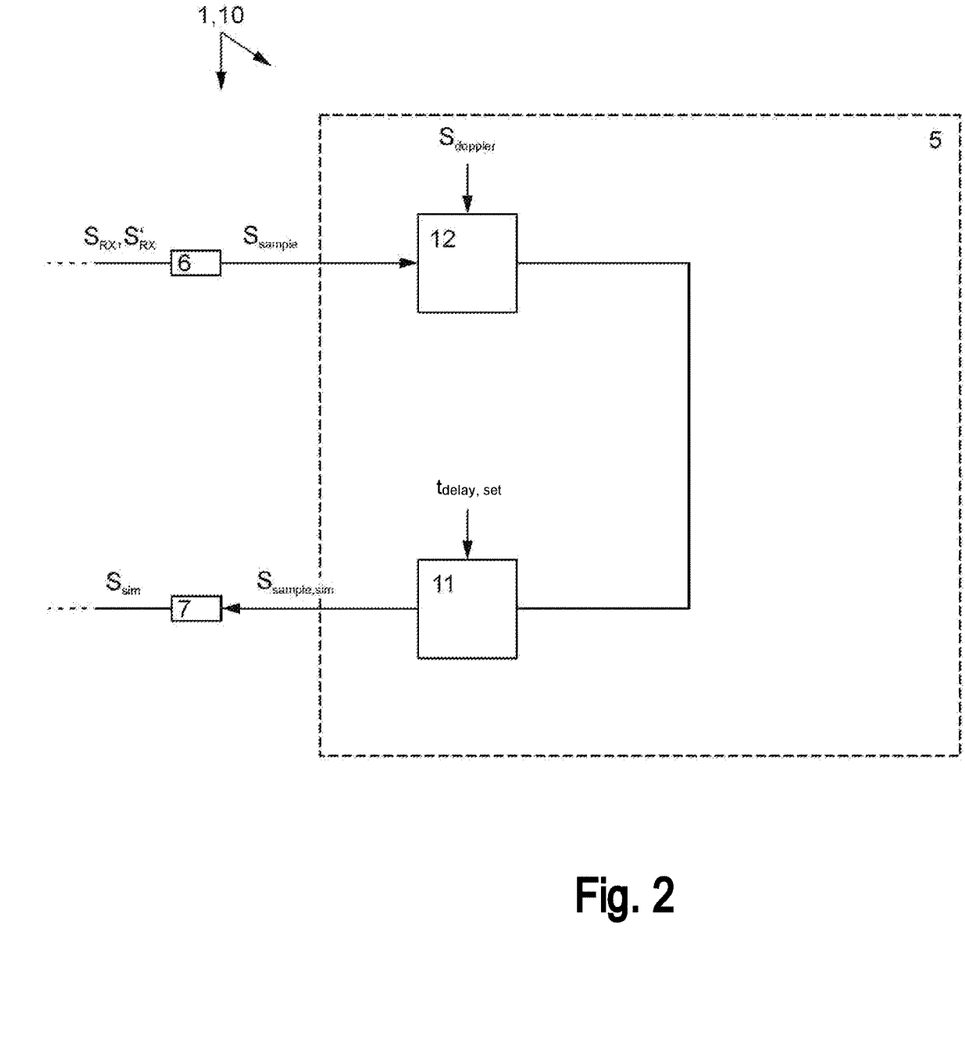
FIG. 2 schematically depicts an exemplary embodiment of a testing device and a method for operating the testing device, including the possibility of impressing a Doppler signature.
Figure 3:
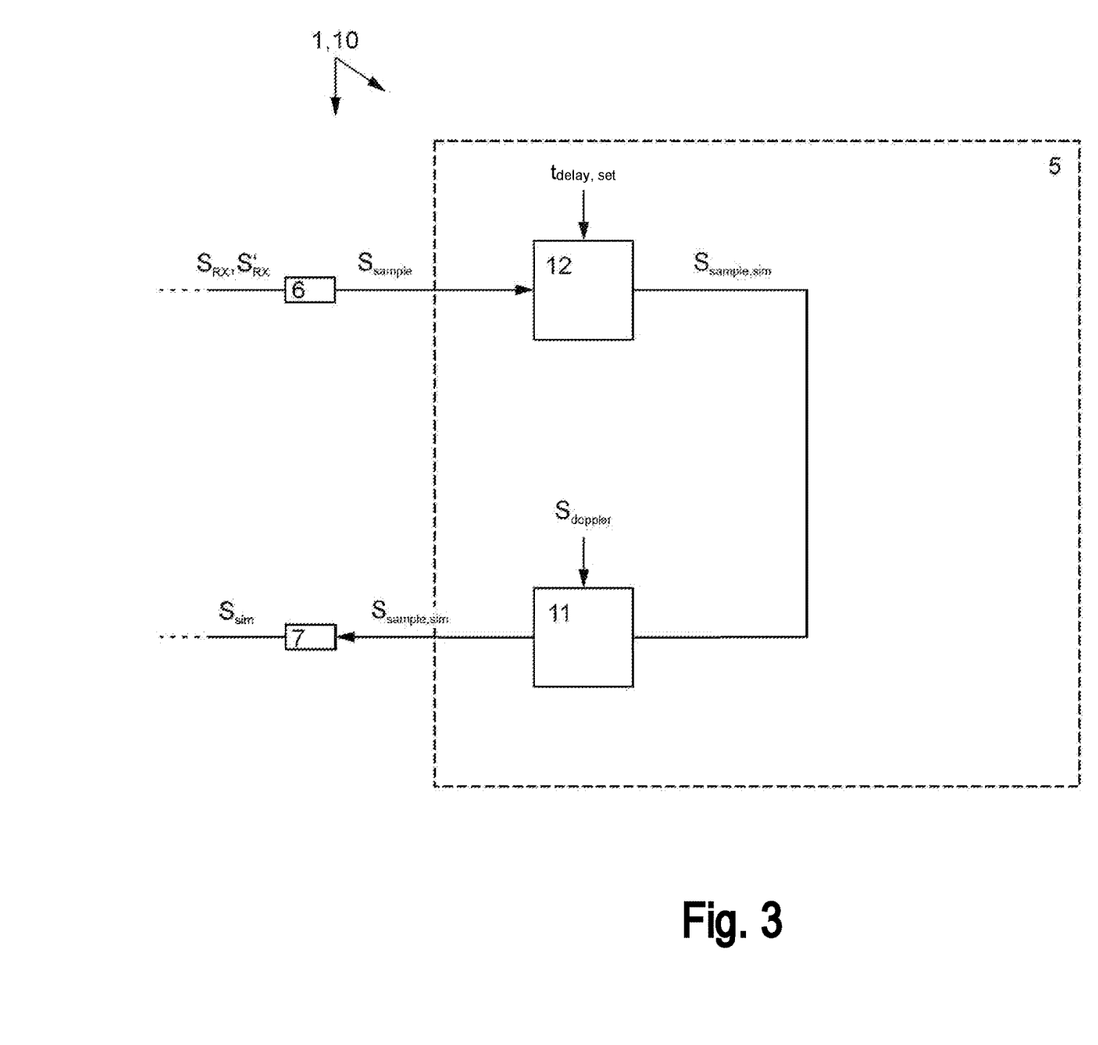
FIG. 3 schematically illustrates another exemplary embodiment of a testing device and a method for operating the testing device, including the possibility of impressing a Doppler signature.

In the testing device 1 and the method 10 according to FIG. 2, signal-processing unit 5 first modulates 12 the Doppler signature $S_{doppler}$ upon the sampled signal $S_{sample}$, and the sampled signal $S_{sample}$ provided with the Doppler signature $S_{doppler}$ is then delayed 11 to form the delayed sampled signal $S_{sample,sim}$ using the set time delay $t_{delay,\ set}$. In contrast, in the testing device 1 according to FIG. 3, signal-processing unit 5 first delays 11 the sampled signal $S_{sample}$ using the set time delay $t_{delay,\ set}$, after which the Doppler signature $S_{doppler}$ is modulated 12 thereupon, thereby producing the delayed sampled signal $S_{sample,sim}$ which is additionally provided with the Doppler signature $S_{doppler}$.

Figure 4:
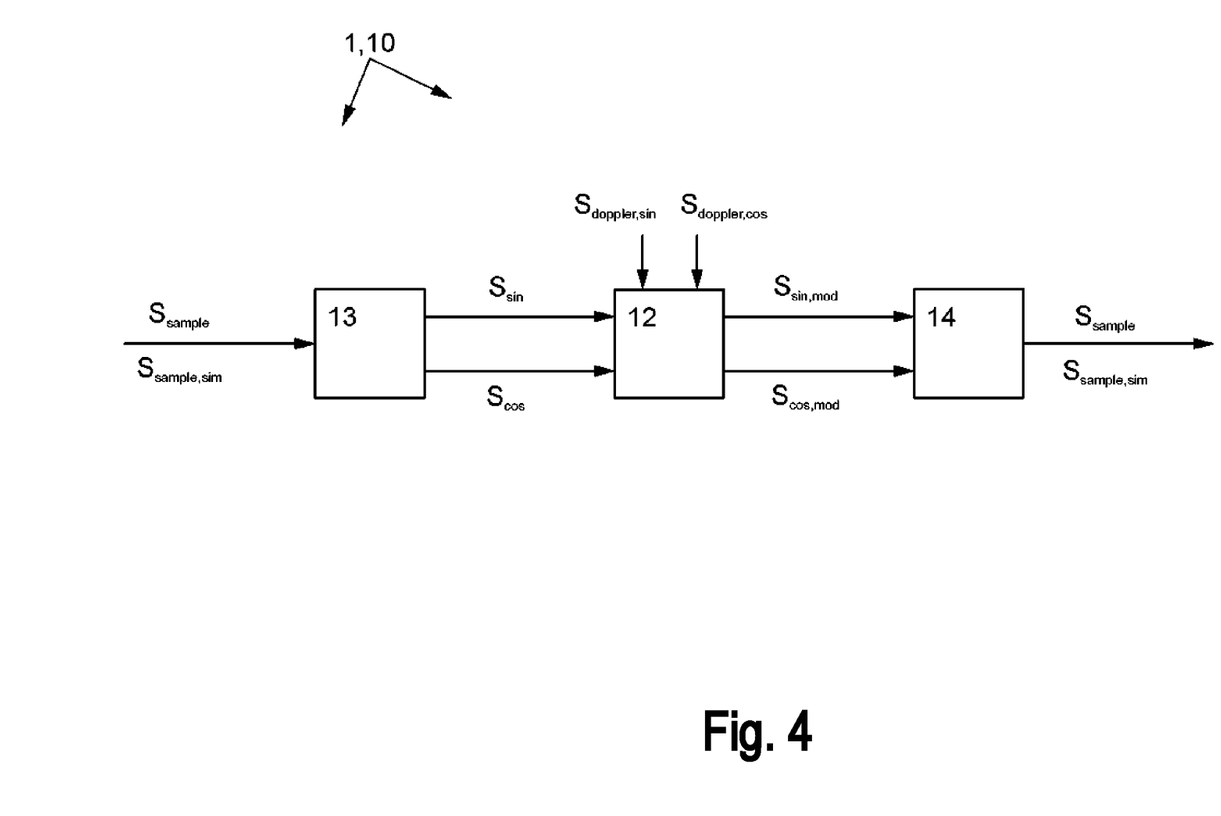
FIG. 4 schematically shows a further exemplary embodiment of a testing device and a method for operating the testing device, including the possibility of impressing a Doppler signature, where the sampled signal are split into orthogonal signal components.

In FIG. 4, it is shown that signal-processing unit 5 splits 13 the sampled signal $S_{sample}$ or the delayed sampled signal Signal $S_{sample,sim}$ (the order does not matter) into orthogonal signal components $S_{sin}$, $S_{cos}$, modulates 12 the orthogonal signal components $S_{sin}$, $S_{cos}$ with respective orthogonal signal components $S_{doppler,sin}$, $S_{doppler,cos}$ of the Doppler signature $S_{doppler}$, and combines 14 the modulated orthogonal signal components $S_{sin,mod}$, $S_{cos,mod}$ so obtained to form the sampled signal $S_{sample,sim}$ which is additionally provided with the Doppler signature $S_{doppler}$.

There are different ways to implement the orthogonal signal splitting. In the exemplary embodiment of the testing device 1 and the method 10 according to FIG. 4, the splitting 13 of the sampled signal $S_{sample}$ or of the delayed sampled signal $S_{sample,sim}$ into orthogonal signal components $S_{sin}$, $S_{cos}$ is performed by I/Q decomposition and the combining 14 of the modulated orthogonal signal components $S_{sin,mod}$, $S_{cos,mod}$ into the sampled signal $S_{sample,sim}$ which is additionally provided with the Doppler signature $S_{doppler}$ is performed by I/Q composition. As already described in the general part of the description, splitting is performed here in a manner known per se by splitting a signal into an in-phase component and a quadrature component and assembling a signal from these orthogonal signal components.

Figure 5:
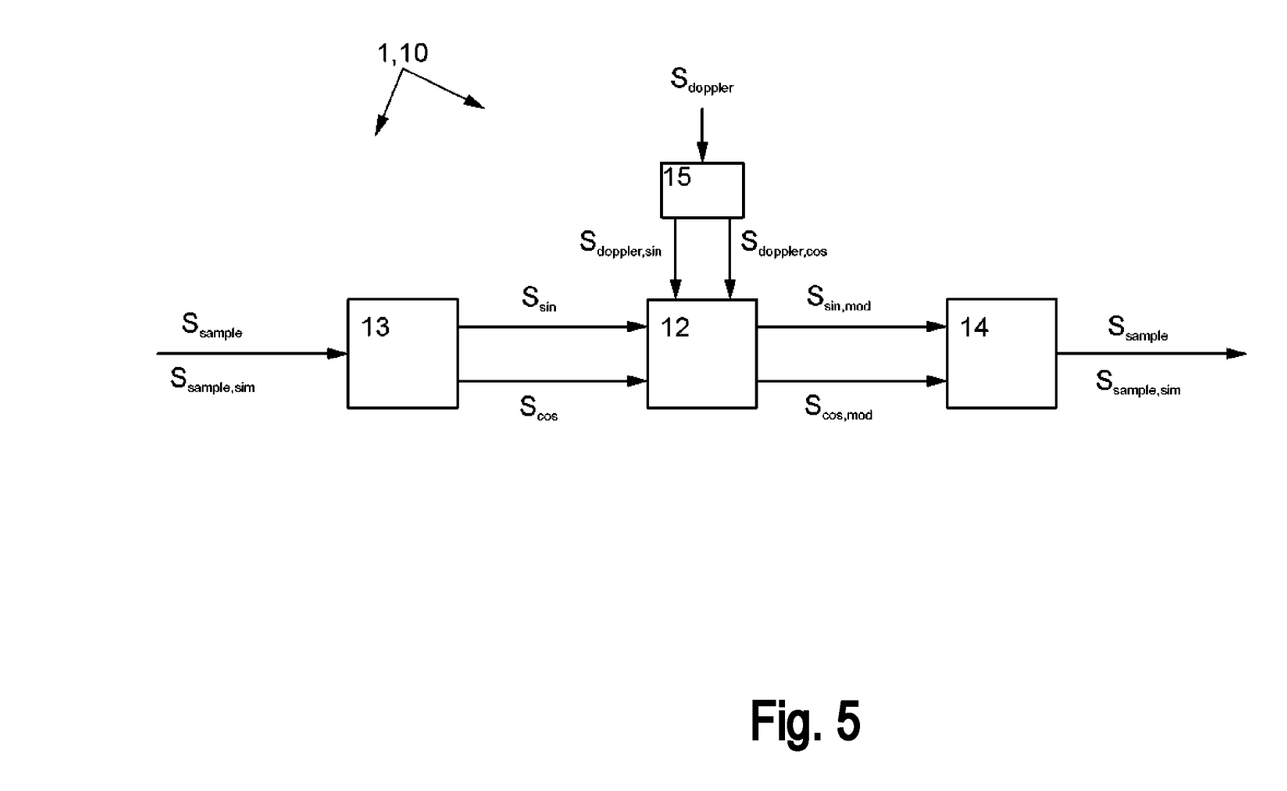
FIG. 5 schematically illustrates another exemplary embodiment of a testing device and a method for operating the testing device, including the possibility of impressing a Doppler signature, where the signal-processing unit derives orthogonal signal components from the Doppler signature.

In the exemplary embodiment of the testing device 1 and the method 10 according to FIG. 5, signal-processing unit 5 derives 15 the orthogonal signal components $S_{doppler,sin}$, $S_{doppler,cos}$ from the Doppler signature $S_{doppler}$, in the present case by I/Q decomposition of the Doppler signature $S_{doppler}$. In contrast, in the testing device 1 and the method 10 according to FIG. 4, the orthogonal signal components $S_{doppler,sin}$, $S_{doppler,cos}$ are input as the Doppler signature $S_{doppler}$.

Figure 6:
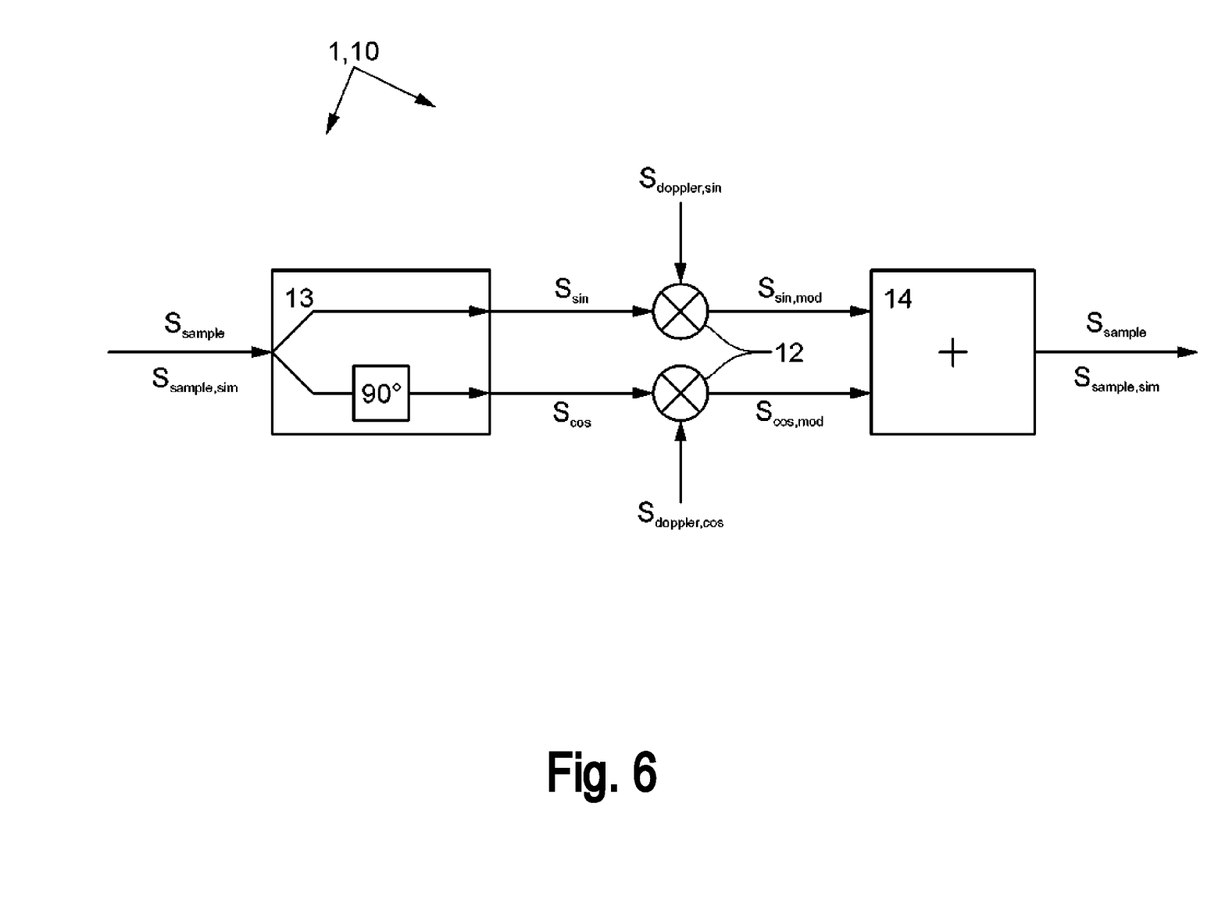
FIG. 6 schematically depicts another exemplary embodiment of a testing device and a method for operating the testing device, including the possibility of impressing a Doppler signature, where the impression of the Doppler signature is effected only by performing additions and multiplications.

FIG. 6 shows a preferred embodiment of the testing device 1 and the method 10, which is characterized in that the splitting 13 of the sampled signal $S_{sample}$ or of the delayed sampled signal $S_{sample,sim}$ into orthogonal signal components $S_{in}$, $S_{cos}$ is performed by a 90° phase shifting of the sampled signal $S_{sample}$ of the delayed sampled signal $S_{sample,sim}$. Furthermore, the modulating 12 of the orthogonal signal components $S_{sin}$, $S_{cos}$ is accomplished by multiplication with the respective orthogonal signal components $S_{doppler,sin}$, $S_{doppler,cos}$ of the Doppler signature $S_{doppler}$, and the combining 14 of the modulated orthogonal signal components $S_{sin,mod}$, $S_{cos,mod}$ to form the sampled signal $S_{sample,sim}$ which is additionally provided with the Doppler signature $S_{doppler}$ is accomplished by addition of the modulated orthogonal signal components $S_{sin,mod}$, $S_{cos,mod}$. Thus, only basic mathematical operations are used, which can be performed relatively quickly. This is also true for the 90° phase shifting of the sampled signal when performed using, for example, a Hilbert transform implemented as a digital FIR filter (additions, multiplications, delays).

Figure 7:
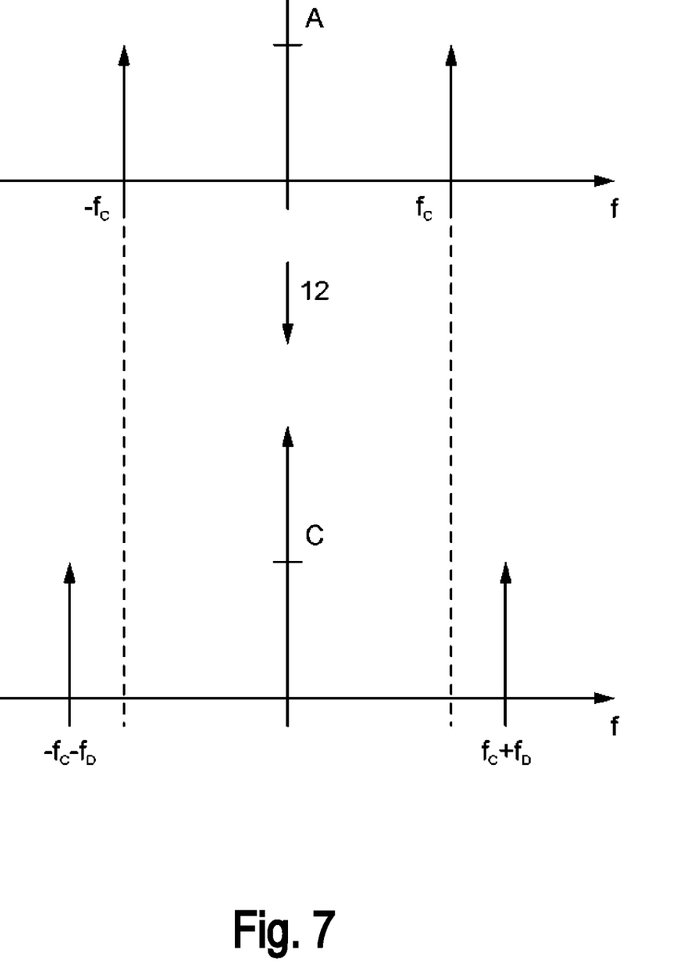
FIG. 7 schematically illustrates the implementation of and the effect obtained by the impression of a Doppler signature by way of a simple example.

FIG. 7 illustrates, by way of a simple example, the practical implementation of the modulation 12 of a Doppler signature $S_{doppler}$ upon the sampled signal $S_{sample}$ or upon the delayed sampled signal Signal $S_{sample,sim}$. The operations could be performed in this way using, for example, the testing device according to FIG. 6. The sampled signal $S_{sample}$ is a harmonic wave having the frequency $f_C$, upon which the Doppler signature $S_{doppler}$ is to be impressed. The Doppler signature is intended to cause a frequency deviation $f_D$ toward higher frequencies. In FIG. 7, the amplitude spectrum of sampled signal $S_{sample}$ is shown at the top. In order to keep the representation as simple as possible, time-continuous notation is used here throughout. Accordingly, under this condition, the sampled signal $S_{sample}$ can be described by:

$$S_{sample}=A*\cos(2\pi*f_C*t)$$

In the complex-valued frequency spectrum or in the amplitude spectrum, the real-valued signal has signal components at positive and negative frequencies, in this simple example at the frequency $f_C$ with the amplitude A (see the upper portion of FIG. 7).

The splitting 13 of the sampled signals $S_{sample}$ into orthogonal signal components $S_{sin}$, $S_{cos}$ is performed by 90° phase shifting of the sampled signal $S_{sample}$. Thus, it results that:

$$S_{cos} = A*\cos(\omega_C*t - \pi/2)$$

$$S_{sin} = A*\cos(\omega_C*t).$$

The simulated reflected signal is ultimately to have the frequency $f_C+f_D$ and to be attenuated to the amplitude C (see the lower portion of FIG. 7). To achieve this, the following orthogonal signal components $S_{doppler,sin}$, $S_{doppler,cos}$ of the Doppler signature $S_{doppler}$ are used:

$$S_{doppler,cos} = C/A*\cos(\omega_D*t + \pi/2)$$

$$S_{doppler,sin} = C/A*\cos(\omega_D*t).$$

Thus, after modulating 12 the orthogonal signal components $S_{sin}$, $S_{cos}$ by multiplication with the respective orthogonal signal components $S_{doppler,sin}$, $S_{doppler,cos}$ of the Doppler signature $S_{doppler}$, the following signals are obtained:

$$S_{cos,mod} = C*\cos(\omega_C*t - \pi/2)*\cos(m*t + \pi/2)$$

$$S_{sin,mod} = C*\cos(\omega_C*t)*\cos(\omega_D*t).$$

The combining 14 of the modulated orthogonal signal components $S_{sin,mod}$, $S_{cos,mod}$ into the sampled signal $S_{sample,sim}$ which is additionally provided with the Doppler signature $S_{doppler}$ is performed by addition of the modulated orthogonal signal components $S_{sin,mod}$, $S_{cos,mod}$:

$$\begin{aligned} S_{sample,sim} &= \frac{C*[\cos(\omega_C*t)*\cos(\omega_D*t) + \cos(\omega_C*t - \times/2)*}{\cos(\omega_D*t + \pi/2)]} \\ &= C*[\cos(\omega_C*t)*\cos(\omega_D*t) - \sin(\omega_C*t)*\sin(\omega_D*t)] \\ &= C*\cos(\{\omega_C + \omega_D\}*t) \end{aligned}$$

Analogously, any other Doppler signatures $S_{doppler}$ may be modulated 12 upon the sampled signal $S_{sample}$ or upon the delayed sampled signal $S_{sample,sim}$, in a very simple manner.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 testing device
2 distance sensor
3 receiving element
4 radiating element
5 signal-processing unit
6 analog-to-digital converter
7 digital-to-analog converter
8 input mixer
9 output mixer
10 method
11 delaying
12 impressing a Doppler signature as a modulation
13 splitting into orthogonal signal components
14 combining modulated orthogonal signal components
15 deriving orthogonal signal components from the Doppler signature
$S_{RX}$ receive signal
$S'_{RX}$ receive signal derived from the receive signal $S_{RX}$
$S_{TX}$ output signal
$S_{sample}$ sampled signal
$t_{delay, set}$ settable time delay
$S_{sample,sim}$ delayed sampled signal, which may additionally be provided with a Doppler signature
$S_{sim}$ simulated reflected signal
$S'_{sim}$ derived simulated reflected signal
$S_{doppler}$ Doppler signature
$S_{sin}$, $S_{cos}$ orthogonal signal components of the sampled signal or of the delayed sampled signal
$S_{doppler,sin}$, orthogonal signal components of the Doppler signature
$S_{doppler,cos}$
$S_{sin,mod}$,
$S_{cos,mod}$ modulated orthogonal signal components

The invention claimed is:

1. A testing device for testing a distance sensor that operates using electromagnetic waves, the testing device comprising:
   a receiver for receiving an electromagnetic free-space wave as a receive signal;
   an analog-to-digital converter configured to, in a simulation mode, convert the receive signal or a receive signal derived from the receive signal into a sampled signal;
   a signal-processing unit configured to:
      delay, using a settable time delay, the sampled signal or a modulated sampled signal to form a delayed sampled signal or a modulated delayed sampled signal; and
      modulate, upon the sampled signal or upon the delayed sampled signal, a predeterminable Doppler signature as a characteristic motion profile of a reflecting object to be simulated to form the modulated sampled signal or the modulated delayed sampled signal;
   a digital-to-analog converter configured to convert the modulated sampled signal or the modulated delayed sampled signal into a simulated reflected signal; and
   a transmitter configured to radiate the simulated reflected signal or a simulated reflected signal derived from the simulated reflected signal as an output signal;

wherein the signal-processing unit is configured to:
split the sampled signal or the delayed sampled signal into orthogonal signal components;
modulate the orthogonal signal components with respective orthogonal signal components of the Doppler signature; and
combine the modulated orthogonal signal components so obtained to form the modulated sampled signal or the modulated delayed sampled signal.

2. The testing device according to claim 1, wherein the signal-processing unit is configured to first modulate the Doppler signature upon the sampled signal and then delay the modulated sampled signal using the set time delay to form the modulated delayed sampled signal; or
wherein the signal-processing unit is configured to first delay the sampled signal using the set time delay and then modulate the Doppler signature thereupon, thereby producing the modulated delayed sampled signal.

3. The testing device according to claim 1, wherein the signal-processing unit is configured to derive the orthogonal signal components from the Doppler signature by I/Q decomposition of the Doppler signature; or
wherein the signal-processing unit is configured to receive the orthogonal signal components as the Doppler signature.

4. The testing device according to claim 1, wherein the splitting of the sampled signal or of the delayed sampled signal into the orthogonal signal components is performed by I/Q decomposition; and
wherein the combining of the modulated orthogonal signal components to form the modulated sampled signal or the modulated delayed sampled signal is performed by I/Q composition.

5. The testing device according to claim 1, wherein the splitting of the sampled signal or of the delayed sampled signal into the orthogonal signal components is performed by a 90° phase shifting of the sampled signal or of the delayed sampled signal; and/or
wherein the modulating of the orthogonal signal components is performed by multiplication with respective orthogonal signal components of the Doppler signature; and/or
wherein the combining of the modulated orthogonal signal components to form the modulated sampled signal or the modulated delayed sampled signal is performed by addition of the modulated orthogonal signal components.

6. A computer-implemented method for operating a testing device for testing a distance sensor that operates using electromagnetic waves, comprising:
receiving, by a receiver of the testing device, an electromagnetic free-space wave as a receive signal;
converting, by an analog-to-digital converter of the testing device, in a simulation mode, the receive signal or a receive signal derived from the receive signal into a sampled signal;
delaying, by a signal-processing unit of the testing device, using a settable time delay, the sampled signal or a modulated sampled signal to form a delayed sampled signal or a modulated delayed sampled signal;
modulating, by the signal-processing unit, upon the sampled signal or upon the delayed sampled signal, a predeterminable Doppler signature as a characteristic motion profile of a reflecting object to be simulated to form the modulated sampled signal or the modulated delayed sampled signal;
converting, by a digital-to-analog converter of the testing device, the modulated sampled signal or the modulated delayed sampled signal into a simulated reflected signal; and
radiating, by a transmitter of the testing device, the simulated reflected signal or a simulated reflected signal derived from the simulated reflected signal as an output signal;
wherein the signal-processing unit splits the sampled signal or the delayed sampled signal into orthogonal signal components, modulates the orthogonal signal components with respective orthogonal signal components of the Doppler signature, and combines the modulated orthogonal signal components so obtained to form the modulated sampled signal or the modulated delayed sampled signal.

7. The method according to claim 6, wherein the signal-processing unit first modulates the Doppler signature upon the sampled signal and then delays the modulated sampled signal using the set time delay to form the modulated delayed sampled signal; or
wherein the signal-processing unit first delays the sampled signal using the set time delay and then modulates the Doppler signature thereupon, thereby producing the modulated delayed sampled signal.

8. The method according to claim 6, wherein the signal-processing unit derives the orthogonal signal components from the Doppler signature by I/Q decomposition of the Doppler signature; or
wherein the signal-processing unit receives the orthogonal signal components as the Doppler signature.

9. The method according to claim 6, wherein the splitting of the sampled signal or of the delayed sampled signal into the orthogonal signal components is performed by I/Q decomposition; and
wherein the combining of the modulated orthogonal signal components to form the modulated sampled signal or the modulated delayed sampled signal is performed by I/Q composition.

10. The method according to claim 6, wherein the splitting of the sampled signal or of the delayed sampled signal into the orthogonal signal components is performed by a 90° phase shifting of the sampled signal or of the delayed sampled signal; and/or
wherein the modulating of the orthogonal signal components is performed by multiplication with respective orthogonal signal components of the Doppler signature; and/or
wherein the combining of the modulated orthogonal signal components to form the modulated sampled signal or the modulated delayed sampled signal is performed by addition of the modulated orthogonal signal components.

11. A non-transitory computer-readable medium having executable instructions stored thereon, wherein the executable instructions, when executed, facilitate:
receiving, by a receiver of the testing device, an electromagnetic free-space wave as a receive signal;
converting, by an analog-to-digital converter of the testing device, in a simulation mode, the receive signal or a receive signal derived from the receive signal into a sampled signal;
delaying, by a signal-processing unit of the testing device, using a settable time delay, the sampled signal or a modulated sampled signal to form a delayed sampled signal or a modulated delayed sampled signal;

modulating, by the signal-processing unit, upon the sampled signal or upon the delayed sampled signal, a predeterminable Doppler signature as a characteristic motion profile of a reflecting object to be simulated to form the modulated sampled signal or the modulated delayed sampled signal;

converting, by a digital-to-analog converter of the testing device, the modulated sampled signal or the modulated delayed sampled signal into a simulated reflected signal; and radiating, by a transmitter of the testing device, the simulated reflected signal or a simulated reflected signal derived from the simulated reflected signal as an output signal;

wherein the signal-processing unit splits the sampled signal or the delayed sampled signal into orthogonal signal components, modulates the orthogonal signal components with respective orthogonal signal components of the Doppler signature, and combines the modulated orthogonal signal components so obtained to form the modulated sampled signal or the modulated delayed sampled signal.

12. The non-transitory computer-readable medium according to claim 11, wherein the signal-processing unit first modulates the Doppler signature upon the sampled signal and then delays the modulated sampled signal using the set time delay to form the modulated delayed sampled signal; or wherein the signal-processing unit first delays the sampled signal using the set time delay and then modulates the Doppler signature thereupon, thereby producing the modulated delayed sampled signal.

13. The non-transitory computer-readable medium according to claim 11, wherein the signal-processing unit derives the orthogonal signal components from the Doppler signature by I/Q decomposition of the Doppler signature; or wherein the signal-processing unit receives the orthogonal signal components as the Doppler signature.

14. The non-transitory computer-readable medium according to claim 11, wherein the splitting of the sampled signal or of the delayed sampled signal into the orthogonal signal components is performed by I/Q decomposition; and wherein the combining of the modulated orthogonal signal components to form the modulated sampled signal or the modulated delayed sampled signal is performed by I/Q composition.

15. The non-transitory computer-readable medium according to claim 11, wherein the splitting of the sampled signal or of the delayed sampled signal into the orthogonal signal components is performed by a 90° phase shifting of the sampled signal or of the delayed sampled signal; and/or wherein the modulating of the orthogonal signal components is performed by multiplication with respective orthogonal signal components of the Doppler signature; and/or wherein the combining of the modulated orthogonal signal components to form the modulated sampled signal or the modulated delayed sampled signal is performed by addition of the modulated orthogonal signal components.

* * * * *